(12) United States Patent
Shiraishi (10) Patent No.: US 10,427,343 B2
(45) Date of Patent: Oct. 1, 2019

(54) INJECTION MOLDING SYSTEM (71) Applicant: FANUC Corporation, Yamanashi (JP)

(72) Inventor: Wataru Shiraishi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 210 days.

(21) Appl. No.: 15/245,098

(22) Filed: Aug. 23, 2016

(65) Prior Publication Data
US 2017/0057144 A1 Mar. 2, 2017

(30) Foreign Application Priority Data
Aug. 31, 2015 (JP) .................. 2015-170487

(51) Int. Cl.
B29C 45/76 (2006.01)
B29C 45/42 (2006.01)

(52) U.S. Cl.
CPC ...... *B29C 45/7626* (2013.01); *B29C 45/4225* (2013.01); *B29C 2045/4266* (2013.01); *B29C 2045/7633* (2013.01); *B29C 2945/76013* (2013.01); *B29C 2945/76317* (2013.01); *B29C 2945/76421* (2013.01); *B29C 2945/76505* (2013.01); *B29C 2945/76795* (2013.01); *B29C 2945/76899* (2013.01)

(58) Field of Classification Search
CPC .... B29C 2045/4266; B29C 2045/7633; B29C 2945/76013; B29C 2945/76317; B29C 2945/76421; B29C 2945/76505; B29C 2945/76795; B29C 2945/76899; B29C 45/4225; B29C 45/7626; B29C 45/42; B29C 37/0007; H02H 11/00; B25J 9/1674; B25J 13/08; B25J 9/1612; B25J 9/1633; B25J 9/1646; B25J 9/1669; G05B 2219/39084; G05B 2219/39116; G05B 2219/39319; G05B 2219/39327; G05B 2219/39464; G05B 2219/39478; G05B 2219/40559
USPC .......................... 425/139; 700/245; 307/326
See application file for complete search history.

(56) References Cited

U.S. PATENT DOCUMENTS

2004/0140787 A1 7/2004 Okamoto et al.
2005/0276877 A1 12/2005 Nihei et al.
(Continued)

FOREIGN PATENT DOCUMENTS

CN 1824472 A 8/2006
JP 2004-167674 A 6/2004
(Continued)

OTHER PUBLICATIONS

JP2008213119A-MT (Year: 2008).*
"FANUC Robot CR-35iA, a collaborative robot", manufactured and printed by FANUC Corporation, Japan, Apr. 2015, Retrieved from the Internet: http://www.fanuc.co.jp/ja/procuct/catalog/pdf/robot/RCR-35iA(J)_01.pdf, on Aug. 7, 2017, 4 pp.
(Continued)

Primary Examiner — Matthew J Daniels
Assistant Examiner — Yunju Kim
(74) Attorney, Agent, or Firm — Hauptman Ham, LLP (57) ABSTRACT In an injection molding system, a holding force changing means reduces a holding force to a predetermined level or less if a predetermined or higher load is detected by an external load detection means after a molded article is transported to a work area of an operator by a molded article transport device. Thus, the operator can easily take out and inspect the molded article.

11 Claims, 5 Drawing Sheets

(56) References Cited

U.S. PATENT DOCUMENTS

| | | | |
|---|---|---|---|
| 2012/0043831 A1* | 2/2012 | Sakakibara | B25J 9/1674 307/326 |
| 2012/0253516 A1 | 10/2012 | Iida | |
| 2016/0311146 A1 | 10/2016 | Ichihara et al. | |

FOREIGN PATENT DOCUMENTS

| | | | |
|---|---|---|---|
| JP | 2005-219161 A | | 8/2005 |
| JP | 2005-349762 A | | 12/2005 |
| JP | 2008213119 A | * | 9/2008 |
| JP | 2012-40626 A | | 3/2012 |
| JP | 2012-206206 A | | 10/2012 |
| JP | 2016-203557 A | | 12/2016 |

OTHER PUBLICATIONS

"Working together" robot is safe green!? Fanuc exhibits human cooperative robot, at the 27th Japan International Machine Tool Fair 2014, held Oct. 30-Nov. 5, 2014 at Bigsite Tokyo, Japan, Retrieved from the Internet: http://monoist.atmarkit.co.jp/mn/articles/1411/05/news028.html on Oct. 16, 2017, 4 pp.

Tanya M. Anandan, "Robots, the Plastics Molder's Best Friend", Robotics Online, Jul. 23, 2015, Retrieved from the Internet: http://www.robotics.org/content-detail.cfm/content_id/5599 on Oct. 16, 2017, 11 pp.

Decision to Grant a Patent in JP Application No. 2015-170487, dated Aug. 22, 2017, 6 pp.

Office Action in CN Application No. 201610792542.6, dated Mar. 27, 2018, 22pp.

* cited by examiner

INJECTION MOLDING SYSTEM

RELATED APPLICATIONS

The present application claims priority to Japanese Application No. 2015-170487, filed Aug. 31, 2015, the disclosure of which is hereby incorporated by reference herein in its entirety.

BACKGROUND OF THE INVENTION

Field of the Invention

The present invention relates to an injection molding system, and more particularly, to an injection molding system with a device configured to cooperate with an operator.

Description of the Related Art

In some cases, a molded article take-out machine may be disposed together with an injection molding machine in order to take out a molded article or a runner remaining in an opened mold after the molded article is molded in the injection molding machine. The molded article or the runner taken out by the molded article take-out machine is transported thereafter to a work area of an operator by means of the molded article take-out machine itself, molded article transport device, or the like and inspected by the operator. The molded article may sometimes be determined for conformity based on the result of the inspection and separated by a molded article separation means.

Japanese Patent Application Laid-Open No. 2005-349762 discloses a technique related to a molded article take-out machine mounted on an injection molding machine and configured to take out a molded article when a mold of the molding machine is opened. This molded article take-out machine is provided with a partition means, such as a safety guard, which separates a motion space of the molded article take-out machine from an operating space to be entered by an operator to operate a molding machine control unit lest the two spaces overlap, or otherwise, a buffer area is set in place.

Japanese Patent Application Laid-Open No. 2012-40626 discloses a technique related to a human collaborative robot system in which a robot and a man share an area for collaborative work. If a detection value of a working device on the distal end of the robot or a force sensor attached to the robot exceeds a predetermined value, in this robot system, the robot is stopped or the motion of the robot is controlled so that the detection value of the force sensor is reduced.

In the prior art technique and the technique disclosed in Japanese Patent Application Laid-Open No. 2005-349762, it is necessary to provide the safety guard for separating the motion area of the molded article take-out machine or the transport device, such as a conveyor, from the work area of the operator, in order to ensure the safety of the operator, in transporting the molded article or the runner by the molded article take-out machine itself or the transport device. In some cases, therefore, the entire area of an injection molding system may be extended.

Although the human-robot collaborative work is described for the technique disclosed in Japanese Patent Application Laid-Open No. 2012-40626, there is no disclosure of any specific work for collaboration.

Since the molded article take-out machine normally grips the molded article with a strong force, moreover, it is difficult for the operator to directly receive the molded article gripped by the take-out machine. Thus, in order to perform a visual inspection and confirmation of the molded article directly held by a hand of the operator, the operator is expected to remove the molded article from the conveyor or the like after the molded article is temporarily put on the conveyor or the like by the molded article take-out machine.

SUMMARY OF THE INVENTION

Accordingly, the object of the present invention is to provide an injection molding system configured so that an operator can easily take out and inspect a molded article without extending an area that constitutes the injection molding system.

An injection molding system according to the present invention comprises an injection molding machine, which comprises a mold and molds a molded article by means of the mold, and a molded article transport device, which takes out the molded article from the mold and transports the molded article, and configured so that the molded article transport device and an operator share an area in common and perform cooperative work. The injection molding system comprises a holding force changing means for changing a holding force of the molded article transport device to hold the molded article and an external load detection means for detecting an external load applied to the molded article held by the molded article transport device. The holding force changing means reduces the holding force to a predetermined level or less if a predetermined or higher load is detected by the external load detection means after the molded article is transported to the work area of the operator by the molded article transport device.

Thus, in the injection molding system configured so that the molded article transport device and the operator share the area in common, the holding force changing means can reduce the holding force so that the operator can easily remove the molded article from the molded article transport device if an external force produced as the molded article is gripped by the operator is detected by the external load detection means when the molded article transport device delivers the molded article to the operator.

An injection molding system according to the present invention comprises an injection molding machine, which comprises a mold and molds a molded article by means of the mold, and a molded article transport device, which takes out the molded article from the mold and transports the molded article, and configured so that the molded article transport device and an operator share an area in common and perform cooperative work. The injection molding system comprises a holding force changing means for changing a holding force of the molded article transport device to hold the molded article. The holding force changing means reduces the holding force to a predetermined level or less when the molded article transport device is moved by a predetermined distance or for a predetermined time after getting hold of the molded article.

Thus, the holding force changing means can reduce the holding force before the operator accesses the molded article so that the operator can easily receive the molded article if a position in which the operator receives the molded article from the molded article transport device or the time elapsed from the removal of the molded article from the mold by the molded article transport device until the operator receives the molded article from the molded article transport device is known in advance.

An injection molding system according to the present invention comprises an injection molding machine, which comprises a mold and molds a molded article by means of the mold, and a molded article transport device, which takes out the molded article from the mold and transports the molded article, and configured so that the molded article transport device and an operator share an area in common and perform cooperative work. The injection molding system comprises a holding force changing means for changing a holding force of the molded article transport device to hold the molded article and an approach detection means for detecting an object approaching a molded article holding unit of the molded article transport device. The holding force changing means reduces the holding force to a predetermined level or less if the approach of the object is detected by the approach detection means.

Thus, the holding force changing means can reduce the holding force to facilitate the operator to receive the molded article when a hand or the like of the operator approaches the molded article holding unit.

The approach detection means may be a human sensor.

The molded article transport device may be a robot.

The injection molding system may further comprise an operator position detection means for detecting a position of the operator, and the molded article transport device may transport the molded article to a molded article reception position of the operator detected by the operator position detection means.

The operator position detection means may be a human sensor.

Thus, the position of the operator can be detected by the operator position detection means, so that the molded article can be transported to the operator position detected by the operator position detection means even when the operator is not in any specified position.

The injection molding system may further comprise an authentication means, and the molded article may be transported to the operator if the operator is authenticated as a pre-registered operator by the authentication means.

Thus, an unregistered operator can be prevented from receiving the molded article by setting such that the molded article can be transported only if the operator is authenticated as a pre-registered specific operator by the authentication means for authenticating the operator.

The molded article transport device may be moved to a standby position before the removal of the molded article if separation of the molded article from the molded article transport device is detected.

Thus, the molded article transport device can be automatically returned to the normal standby position during mass-production molding without any special operation after the molded article is received by the operator.

The injection molding system may comprise a molded article take-out mode and a molded article receiving mode, and the molded article transport device may perform molded article take-out and transport operations for normal mass-production molding when the molded article take-out mode is enabled and the molded article may be transported to a position in which the operator receives the molded article after the molded article is taken out by the molded article transport device when the molded article receiving mode is enabled.

Thus, the molded article take-out mode and the molded article receiving mode in which the molded article is inspected by the operator are provided, and the operation mode is switched to the molded article receiving mode so that the operator can receive the molded article only when the molded article requires an inspection. In this case, moreover, the molded article take-out mode and the molded article receiving mode can be changed as required, so that continuous molding cannot be stopped.

According to the present invention, there can be provided an injection molding system configured so that an operator can easily take out and inspect a molded article without extending an area that constitutes the injection molding system.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
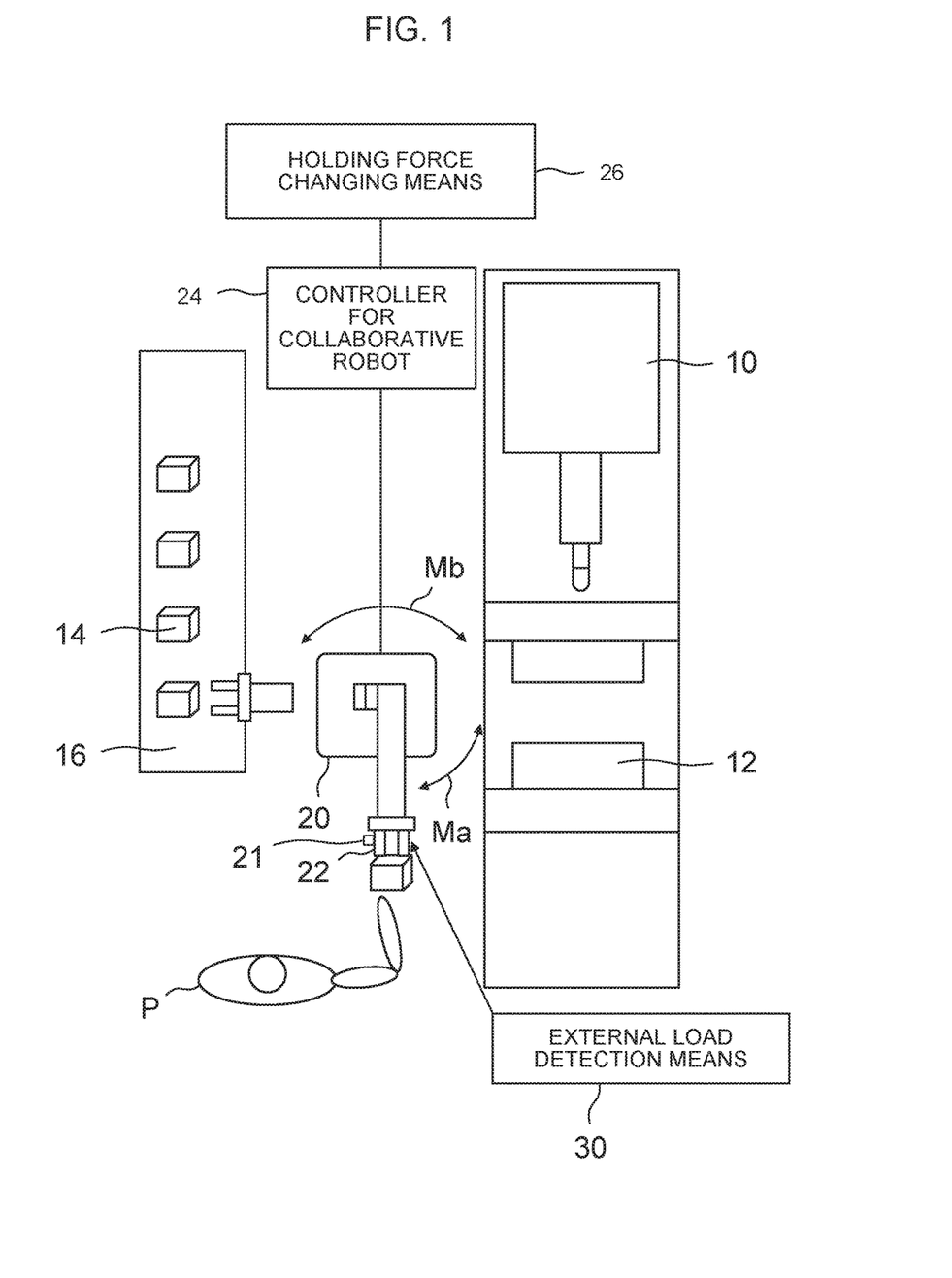
FIG. 1 is a diagram showing an injection molding system according to an embodiment of the present invention.

An embodiment of the present invention will now be described with reference to the accompanying drawings. FIG. 1 is a diagram showing an injection molding system of the present embodiment. An injection molding machine 10 comprises a molded article transport device 20 formed of a collaborative robot. The injection molding machine 10 is constructed in the same manner as a conventional injection molding machine and serves to mold a molded article 14 by injecting a resin into a mold 12 in a clamped state by means of an injection device.

The molded article transport device 20 is located adjacent to the injection molding machine 10 and provided with a hand 22 at its distal end portion such that the hand 22 can grip and transport the molded article 14. Further, the hand 22 is provided with a force sensor (not shown), and the result of detection by the force sensor is transmitted to an external load detection means 30. Furthermore, the molded article transport device 20 is connected with a controller 24 for the collaborative robot, and a holding force changing means 26 is connected to the controller 24 for the collaborative robot.

Force sensors (not shown, e.g., a force sensor 21) are attached to various parts of the molded article transport device 20, and the results of detection by the force sensors are transmitted to the controller 24 for the collaborative robot. If detected values from the force sensors exceed a predetermined threshold due to contact between an operator P and the molded article transport device 20 or the like, the controller 24 for the collaborative robot stops the molded article transport device 20 or actuates the molded article transport device 20 so that the detected values from the force sensors are reduced. In this way, the molded article transport device 20 is restricted from applying excessive force to the operator P.

The molded article transport device 20 according to the present embodiment is provided, as operation modes, with a molded article take-out mode Mb for normal continuous molding and a molded article receiving mode Ma for a molded article inspection by the operator P. When the operation mode is the molded article take-out mode Mb, the molded article transport device 20 takes out the molded article 14 from the mold 12 and transports it directly to a conveyor 16. The molded article 14 put on the conveyor 16 is transported by the conveyor 16. The molded article take-out mode Mb and the molded article receiving mode Ma can be changed as required. In adjusting the molding conditions of the injection molding machine, the molded article receiving mode Ma is continued for a predetermined period of time or until a predetermined number of molded articles are produced. Once the adjustment of the molding conditions is somewhat settled, moreover, the operation mode can also be switched to the molded article take-out mode Mb immediately after one or two molded articles are inspected in the molded article receiving mode Ma at the start of operation of the injection molding machine.

When the operation mode is the molded article receiving mode Ma, the molded article transport device 20 takes out the molded article 14 from the mold 12 and then transports the molded article 14 to a position in which the operator P can receive it. Since the holding force of the hand 22 is reduced after the transport, as described later, the operator P can take out and inspect the molded article 14. The inspected molded article 14 may be held again by the hand 22 as it is transported to the conveyor 16, or otherwise, it may be put directly on the conveyor 16 by the operator P.

The hand 22 is urged to grip the molded article 14 by an air cylinder or a servomotor, normally with a strong force. The force sensor attached to the hand 22 can detect an external load and that the molded article 14 held by the hand 22 is gripped by the operator P. When the external load is detected by the force sensor, the force of the hand 22 to hold the molded article 14 is reduced by the holding force changing means 26 so that the operator P can easily remove the molded article 14. Although the holding force is reduced to such a degree that the operator P can easily remove the molded article 14, the molded article 14 can be prevented from dropping without any operator's operation despite the reduction. Thus, a minimum holding force for each molded article 14 should be previously set in the holding force changing means 26 lest the molded article 14 drop.

Figure 2:
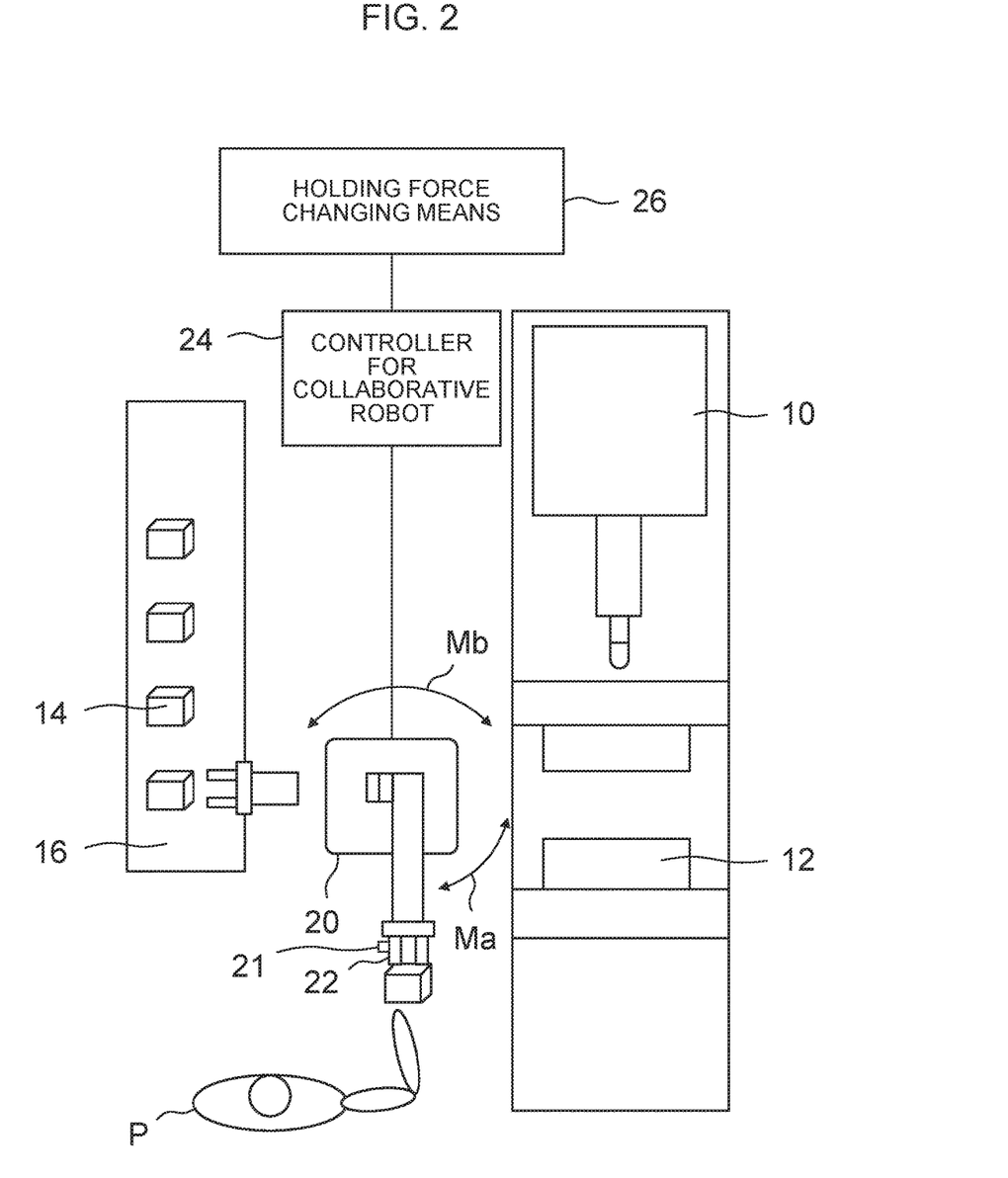
FIG. 2 is a diagram showing an injection molding system according to an embodiment of the present invention.

FIG. 2 is a diagram showing an injection molding system according to an embodiment of the present invention. Basically, the injection molding system of the present embodiment is constructed in the same manner as the embodiment shown in FIG. 1. In the embodiment of FIG. 1, the force of the hand 22 to hold the molded article 14 is reduced by the holding force changing means 26 when the external load is detected by the force sensor attached to the hand 22. In the present embodiment, the holding force for the molded article 14 is reduced to a preset level when the molded article transport device 20 is moved by a predetermined distance or for a predetermined time after taking out the molded article 14 from the mold 12. The present embodiment is particularly effective if an operating position in which the operator P receives the molded article 14 from the molded article transport device 20 is predetermined.

Specifically, in the case where the hand 22 of the molded article transport device 20 is moved to the position of the operator P shown in FIG. 2 by 1 meter in 2 seconds after the molded article 14 is taken out and held by the molded article transport device 20, the operator P is facilitated to receive the molded article 14 if the holding force is reduced during a movement of 0.8 meter or a time interval of 1.6 seconds immediately before the operator P is approached. Further, the possibility of the molded article 14 dropping increases if the molded article 14 is moved at a high speed by the molded article transport device 20 with the holding force reduced. Preferably, therefore, the moving speed of the molded article transport device 20 should be reduced to such a level that the molded article 14 never drops.

Figure 3:
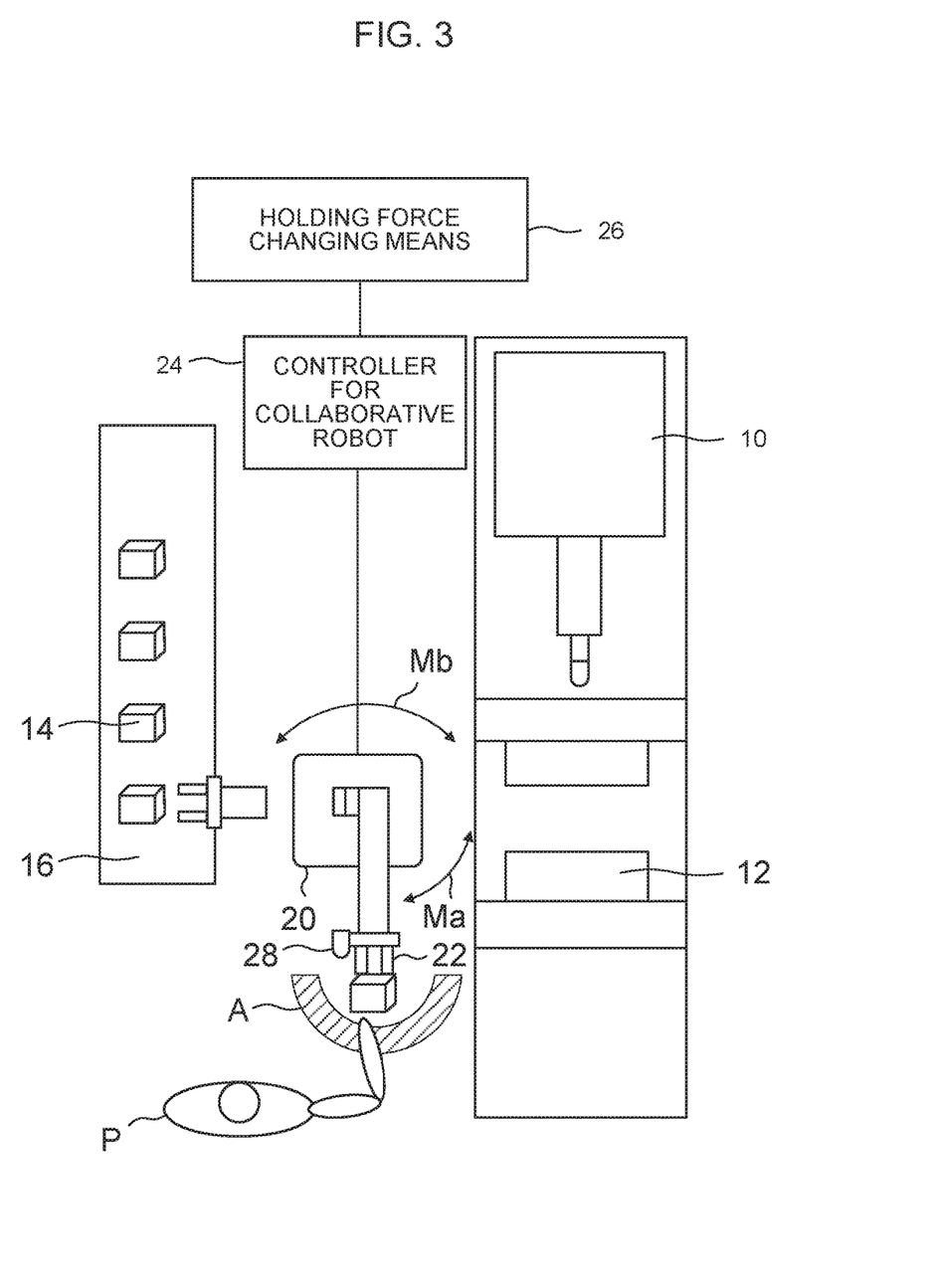
FIG. 3 is a diagram showing an injection molding system according to an embodiment of the present invention.

FIG. 3 is a diagram showing an injection molding system according to an embodiment of the present invention. While the injection molding system of the present embodiment is constructed basically in the same manner as the embodiment shown in FIG. 1, it is different in that the hand 22 is provided with a sensor 28 for use as an approach detection means. Symbol A denotes a detection area of the sensor 28. In the embodiment of FIG. 1, the force of the hand 22 to hold the molded article 14 is reduced by the holding force changing means 26 when the external load is detected by the force sensor attached to the hand 22. In the present embodiment, the holding force for the molded article 14 is reduced to a preset level when an approach of a hand or the like of the operator P to the hand 22 is detected by the sensor 28.

The sensor 28 may be a proximity sensor or a temperature sensor, or otherwise, a human sensor based on the detection of shielding of infrared radiation, ultrasonic waves, visible light, or the like. If the detection by the human sensor is based on the consideration of the direction of motion of the object of detection, in particular, the detection can be performed in consideration of the movement direction of the hand of the operator P, so that the possibility of false detection can be reduced.

Figure 4:
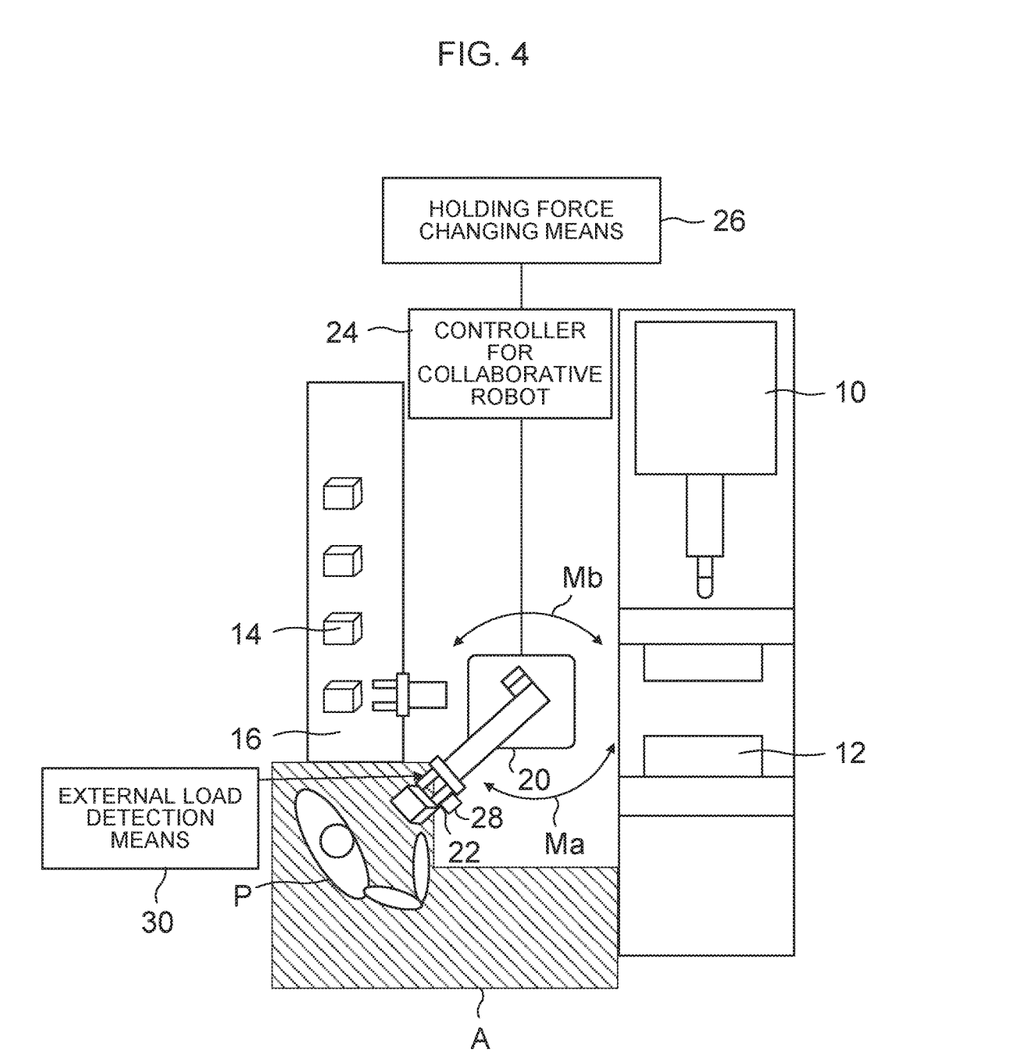
FIG. 4 is a diagram showing an injection molding system according to an embodiment of the present invention.

FIG. 4 is a diagram showing an injection molding system according to an embodiment of the present invention. While the injection molding system of the present embodiment is constructed basically in the same manner as the embodiment shown in FIG. 1, it is different in that the hand 22 is provided with a sensor 28 for use as an approach detection means. Symbol A denotes a detection area of the sensor 28. In the present embodiment, the position of the operator P is detected by the sensor 28 and the molded article 14 is transported to a position in which the operator P can easily receive it.

The sensor 28 may be a proximity sensor or a temperature sensor, or otherwise, a human sensor based on the detection of shielding of infrared radiation, ultrasonic waves, visible light, or the like. If the detection by the human sensor is based on the consideration of the direction of motion of the object of detection, in particular, the detection can be performed in consideration of the movement direction of the operator P, so that the position of the operator P can be detected more accurately.

Figure 5:
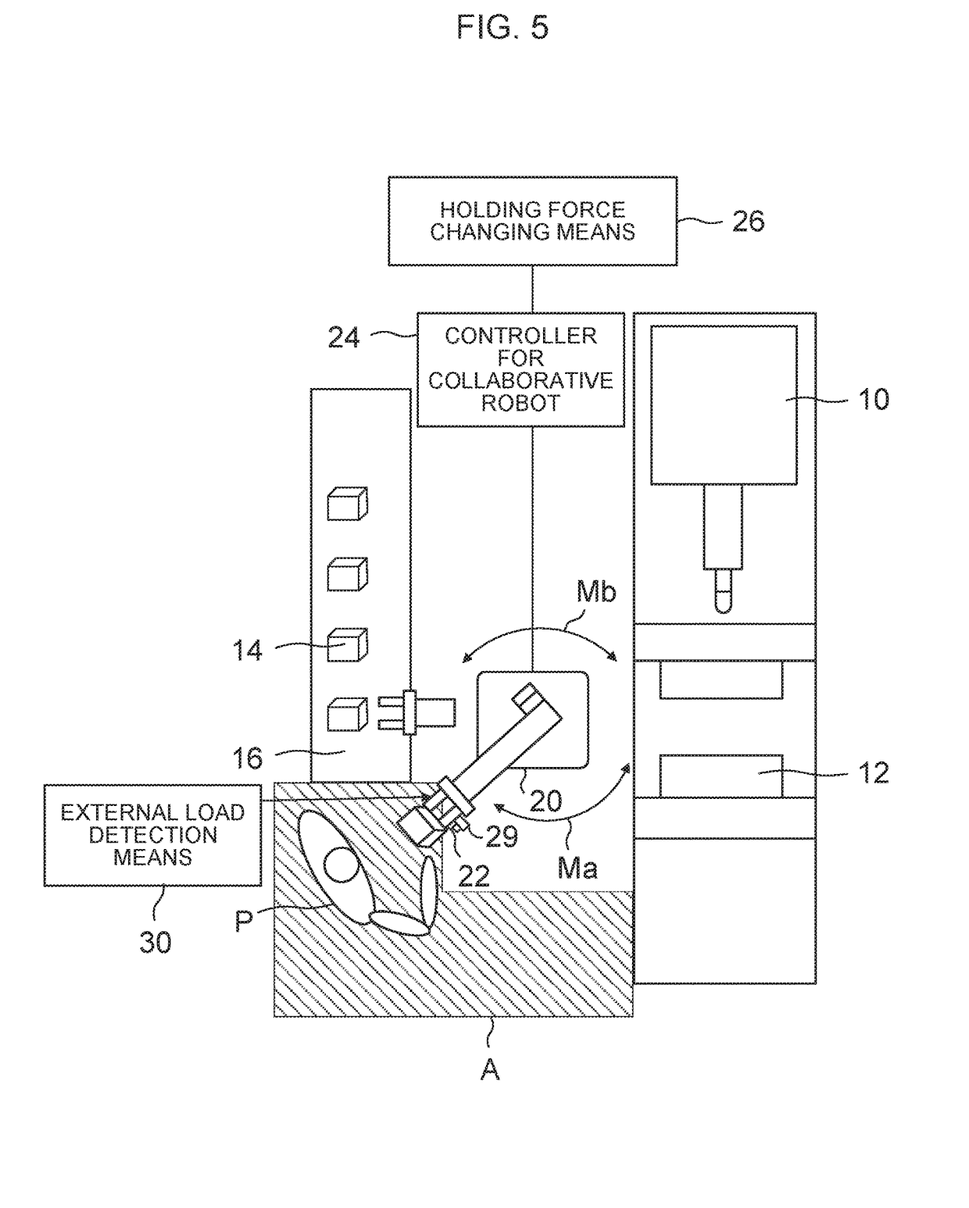
FIG. 5 is a diagram showing an injection molding system according to an embodiment of the present invention.

FIG. 5 is a diagram showing an injection molding system according to an embodiment of the present invention. While the injection molding system of the present embodiment is constructed basically in the same manner as the embodiment shown in FIG. 1, it is different due to the use of a camera 29. The camera 29 is used as an authentication means for the operator P, which can authenticate the face of the operator P. An operation for receiving the molded article 14 is performed only if the operator P is authenticated as a pre-registered operator. Although the camera 29 is used as the authentication means in this example, a fingerprint authentication means or an iris authentication means may be provided in place of the camera 29 such that the operator P can be authenticated by his/her fingerprint or iris. Instead of a biometric authentication means such as the face, fingerprint, or iris authentication means, moreover, a card or an IC tag owned by the operator P may be used for wireless authentication or the like. Furthermore, the authentication of the operator P may be performed with every operation for receiving the molded article 14. Alternatively, the receiving operation for the molded article 14 may be performed without authentication next time or later, on the assumption that the operator P is registered, once the operator P is first authenticated.

In the case where the camera 29 is employed as the authentication means, in particular, the face authentication by the camera 29 may also be used as an operator position detection means. Thus, the operator P can be authenticated to allow the receiving operation for the molded article 14 to be performed, and in addition, the molded article 14 can be transported to the position in which the authenticated operator P can easily receive it.

In these embodiments, moreover, the molded article transport device 20 may be moved to a standby position before the removal of the molded article if separation of the molded article 14 from the hand 22 is detected after the molded article 14 is received from the molded article transport device 20 by the operator P.

Since the load detected by the external load detection means 30 is reduced if the molded article 14 having been held by the hand 22 is removed, the absence of or the separation of the molded article 14 from the hand 22 is detected by the detected load.

The invention claimed is:

1. An injection molding system, comprising:
   an injection molding machine, which comprises a mold and molds a molded article by means of the mold, and
   a molded article transport device, which takes out the molded article from the mold and transports the molded article, and configured so that the molded article transport device and an operator share an area in common and perform cooperative work, the injection molding system comprising:
   a holding force changing means for changing a holding force of the molded article transport device to hold the molded article; and
   an external load detection means for detecting an external load applied to the molded article held by the molded article transport device,
   wherein the holding force changing means is configured to reduce the holding force to a predetermined level or less in response to a detection of a predetermined or higher load by the external load detection means after the molded article is transported to the work area of the operator by the molded article transport device.

2. The injection molding system according to claim 1, wherein the molded article transport device is a robot.

3. The injection molding system according to claim 1, further comprising an operator position detection means for detecting a position of the operator,
   wherein the molded article transport device transports the molded article to a molded article reception position of the operator detected by the operator position detection means.

4. The injection molding system according to claim 3, wherein the operator position detection means is a human sensor.

5. The injection molding system according to claim 1, further comprising an authentication means, wherein the molded article transport device is configured to transport the molded article to the operator in response to the authentication means authenticating the operator as a pre-registered operator.

6. The injection molding system according to claim 1, wherein the molded article transport device is moved to a standby position before the removal of the molded article in response to a detection of separation of the molded article from the molded article transport device.

7. The injection molding system according to claim 1, comprising a molded article take-out mode and a molded article receiving mode,
   wherein
   the molded article transport device performs molded article take-out and transport operations for normal mass-production molding when the molded article take-out mode is enabled, and
   the molded article is transported to a position in which the operator receives the molded article after the molded article is taken out by the molded article transport device when the molded article receiving mode is enabled.

8. The injection molding system according to claim 1, wherein the holding force changing means is configured to reduce the holding force to the predetermined level or less but more than a minimum holding force to prevent the molded article from being dropped from the molded article transport device.

9. An injection molding system, comprising:
   an injection molding machine, which comprises a mold and molds a molded article by means of the mold, and
   a molded article transport device, which takes out the molded article from the mold and transports the molded article, and configured so that the molded article transport device and an operator share an area in common and perform cooperative work, the injection molding system comprising:
   a holding force changing means for changing a holding force of the molded article transport device to hold the molded article; and
   an approach detection means for detecting an object approaching a molded article holding unit of the molded article transport device,
   wherein the holding force changing means is configured to reduce the holding force to a predetermined level or less in response to a detection of the approach of the object by the approach detection means.

10. The injection molding system according to claim 9, wherein the approach detection means is a human sensor.

11. The injection molding system according to claim 9, wherein the holding force changing means is configured to reduce the holding force to the predetermined level or less but more than a minimum holding force to prevent the molded article from being dropped from the molded article transport device.

* * * * *